United States Patent
Bartschies

(10) Patent No.: US 12,240,410 B2
(45) Date of Patent: Mar. 4, 2025

(54) DRIVE DEVICE HAVING A COUPLING DEVICE FOR A VEHICLE FLAP

(71) Applicant: Edscha Engineering GmbH, Remscheid (DE)

(72) Inventor: Christian Bartschies, Remscheid (DE)

(73) Assignee: Edscha Engineering GmbH, Remscheid (DE)

( * ) Notice: Subject to any disclaimer, the term of this patent is extended or adjusted under 35 U.S.C. 154(b) by 0 days.

(21) Appl. No.: 18/633,477

(22) Filed: Apr. 11, 2024

(65) Prior Publication Data
US 2024/0351552 A1    Oct. 24, 2024

(30) Foreign Application Priority Data

Apr. 19, 2023 (DE) ...................... 10 2023 109 933.7

(51) Int. Cl.
*B60R 21/38* (2011.01)
*B62D 25/12* (2006.01)

(52) U.S. Cl.
CPC .............. *B60R 21/38* (2013.01); *B62D 25/12* (2013.01)

(58) Field of Classification Search
CPC ... B60R 21/38; B60R 21/34; B60R 2021/343; B62D 25/12; E05Y 2900/536
USPC ..................................... 180/274, 69.2, 69.21
See application file for complete search history.

(56) References Cited

U.S. PATENT DOCUMENTS

| | | | |
|---|---|---|---|
| 2006/0212201 A1* | 9/2006 | Takahashi | B60R 21/36 701/45 |
| 2015/0107930 A1* | 4/2015 | Kugler | E05F 15/60 180/274 |
| 2022/0118939 A1 | 4/2022 | Pfeifer et al. | |
| 2023/0356688 A1* | 11/2023 | Sardelli | B60R 5/02 |
| 2024/0059246 A1* | 2/2024 | Bauer | B60R 21/38 |
| 2024/0101062 A1* | 3/2024 | Kullmer | E05F 15/72 |

FOREIGN PATENT DOCUMENTS

| | | |
|---|---|---|
| DE | 102006042498 A1 | 3/2008 |
| DE | 102007009096 A1 | 8/2008 |
| DE | 102010027931 A1 | 5/2012 |
| DE | 102014014085 A | 2/2016 |

(Continued)

*Primary Examiner* — Keith J Frisby
(74) *Attorney, Agent, or Firm* — Davidson Kappel LLC

(57) ABSTRACT

A drive device for a pivotable vehicle flap includes a flap part associated with the vehicle flap, a body part associated with a vehicle body and a hinge arrangement which hingedly connects the flap part and the body part. The hinge arrangement allows the flap part to be pivoted about a first axis of rotation for opening and closing the vehicle flap and about a second axis of rotation for raising the vehicle flap into a pedestrian protection position. The drive device further includes a first actuator for opening and closing the vehicle flap in normal operation, a second actuator for raising the vehicle flap into a pedestrian protection position and a coupling device for coupling the first actuator to one of the flap part and the vehicle flap, including a fastening part which is fixedly connected to the one of the flap part and the vehicle flap. The coupling device includes at least one first lever coupled to the first actuator. During normal operation of the coupling device, the first lever is releasably secured against rotation relative to the fastening part via a mechanical securing element.

15 Claims, 6 Drawing Sheets

(56) References Cited

FOREIGN PATENT DOCUMENTS

| DE | 102014014085 A1 * | 2/2016 | ............. B60R 21/38 |
|---|---|---|---|
| DE | 102018125800 A1 | 4/2020 | |
| WO | WO-2011026811 A1 * | 3/2011 | ............. B60R 21/38 |
| WO | WO-2024183858 A1 * | 9/2024 | ............. B60R 21/38 |

* cited by examiner

DRIVE DEVICE HAVING A COUPLING DEVICE FOR A VEHICLE FLAP

The present disclosure relates to a drive device for a vehicle flap, comprising a flap part associated with the vehicle flap, a body part associated with a vehicle body, a hinge arrangement hingedly connecting the flap part and the body part, a first actuator for opening and closing the vehicle flap in normal operation, a second actuator for raising the vehicle flap into the pedestrian protection position, and a coupling device for coupling the first actuator to one of the flap part and the vehicle flap.

BACKGROUND

In practice, drive devices for flaps of vehicles are known which, in normal operation, enable an opening and closing of a vehicle flap via a first actuator between a closed and an open position for maintenance of the vehicle or for luggage loading or luggage unloading. Furthermore, it is known that the drive device can also be used for implementing a pedestrian protection and for this purpose comprises a second actuator which, in the event of a collision with a pedestrian, immediately adjusts the front flap into a raised pedestrian protection position in order to provide a deformation space in a region of the vehicle front. This prevents, in particular, the head of the pedestrian from striking, unbraked, the hard engine block arranged under the front flap.

Since the vehicle flap is suddenly displaced in the event of a collision, the deployment of the vehicle flap must under no circumstances be delayed or even blocked. In general, a particularly fast-acting second actuator is provided for driving the vehicle flap into this pedestrian protection position and is frequently designed as a pyrotechnic actuator. For the combination of such a fast-acting actuator with a first actuator which is intended for normal operation, which is intended for normal opening and closing of the front flap it is problematic that, due to the coupling of the two separately provided actuators via the vehicle flap or via the vehicle body, a delay or even partial blocking of the deployment movement in a collision state of the drive device due to the first actuator may occur.

DE 10 2014 014 085 A1 discloses a drive device for a deployable vehicle flap, comprising a flap part associated with a vehicle flap, a body part associated with a vehicle body, a body part associated with the body part, a hinge arrangement hingedly connecting the flap part and the body part, a first actuator for opening and closing the vehicle flap in normal operation, and a second actuator coupled to the hinge arrangement for raising the vehicle flap into a pedestrian protection position. Furthermore, a coupling device for coupling the first actuator and the second actuator is shown, wherein the coupling device comprises a first lever and a second lever, wherein the first lever is associated with the first actuator and the second lever is associated with the second actuator. Here, the first actuator is coupled with a first end to the vehicle body and with a second end to an intermediate lever of the hinge arrangement. In an open position of the vehicle flap in normal operation, the extended first actuator, the vehicle body, and the vehicle flap form a triangle in a side view, so that lateral access to an engine compartment is made more difficult by the extended first actuator. This arrangement is a disadvantage with regard to possible repair or maintenance of an engine and further miscellaneous parts in an engine compartment of the vehicle.

SUMMARY

An object of the present disclosure is to create a drive device which is designed to be reliable and compact, wherein the drive device provides both a motor-driven opening and closing of the vehicle flap in normal operation and a reliable raising of the vehicle flap into a pedestrian protection position.

According to one aspect of the present disclosure, a drive device for a deployable vehicle flap is provided, comprising a flap part associated with a vehicle flap, a body part associated with a vehicle body, and a hinge arrangement which hingedly connects the flap part and the body part, wherein the hinge arrangement allows pivoting of the flap part about a first axis of rotation for opening and closing the vehicle flap and about at least a second axis of rotation for raising the vehicle flap into a pedestrian protection position. The drive device according to the present disclosure further comprises a first actuator for opening and closing the vehicle flap in normal operation, a second actuator for raising the vehicle flap into the pedestrian protection position, and a coupling device for coupling the first actuator to one of the flap part and the vehicle flap, wherein the coupling device comprises a fastening part which is fixedly connected to the one of the flap part and the vehicle flap. The drive device according to the present disclosure is characterized in that the coupling device comprises at least one first lever coupled to the first actuator, wherein in normal operation, the first lever is releasably secured against rotation relative to the fastening part via a mechanical securing element. In normal operation, the coupling device advantageously forms an overall rigid structure, which allows a defined adjustment of the vehicle flap by means of the first actuator between an open and closed position. Further advantageously, the connection between the first lever and the fastening part is releasable, so that, in particular in the event of a pedestrian protection function being triggered, in which the second actuator causes the vehicle flap to be raised very quickly, the first actuator is released relative to the vehicle flap or the flap part by means of the coupling device. Advantageously, the first actuator does not have to follow the very rapid movement of the vehicle flap or the flap part into the pedestrian protection position, so that neither an undesirable deflection of the first actuator occurs nor is the deployment movement of the vehicle flap delayed by the first actuator.

Preferably, the mechanical securing element at least partially penetrates the first lever and the fastening part and is arranged between the first lever and the fastening part. Particularly preferably, the mechanical securing element is released when the second actuator is actuated, in particular by breaking a predetermined breaking point, so that a release of a rotation of the first lever relative to the fastening part takes place. The force required for releasing the mechanical securing element is advantageously provided by the second actuator itself, so that the release occurs automatically in the event of a pedestrian collision immediately after the second actuator has been triggered. Alternatively, a third actuator can also be provided, which causes the mechanical securing element to be released.

Advantageously, the securing element can then be designed more robustly, and it is prevented that the securing element is released even in normal operation due to the forces caused by the first actuator, which would result in an unintentional unlocking of a deployment movement into the pedestrian protection position. The third actuator is preferably designed as a pyrotechnic actuator. Alternatively, a mechanical release mechanism can also be provided, which causes the securing element to be released.

It is particularly preferred that the coupling device comprises a second lever. Further preferably, the first lever and the second lever are coupled to one another rotatably about a third axis of rotation. A single hinge is expediently arranged between the first lever and the second lever. Further preferably, the second lever is coupled to the fastening part rotatably about a fourth axis of rotation. Advantageously, the first lever and the second lever together form a toggle lever, which becomes movable after the connection between the first lever and the fastening part brought about by the securing element has been released and thus causes a release for the first actuator relative to the flap part or the vehicle flap. In particular, not only a rotational movement of the first actuator coupled to the first lever relative to the fastening part, but also an additional translational displacement relative to the fastening part is advantageously made possible. This is particularly advantageous because the fastening part performs a lifting movement together with the flap part or the vehicle flap, so that the release defined by the first lever also requires a translational component.

In an expedient embodiment, it is provided that the first lever is hingedly coupled to the first actuator via a first connection element. The first connection element is preferably designed as a ball socket. Further preferably, a hinge part is arranged on the first lever, wherein the hinge part is in hinged engagement with the first connection element. The vehicle flap or the flap part can advantageously be pivoted between an open and closed position by a motor-driven change in length of the first actuator. The hinge part is expediently arranged at an end portion of the first lever.

Further preferably, the fourth axis of rotation, about which the second lever is rotatably coupled to the fastening part, is arranged in normal operation between the hinge part and the third hinge axis. The coupling device is advantageously constructed in a particularly compact manner and therefore requires only slightly more installation space than conventional fastening parts for coupling the first actuator to the vehicle flap or the flap part.

Further advantageously, the second lever is arranged in a direction parallel to the third axis of rotation between the first lever and the fastening part. This advantageously ensures that the first lever can be connected unhindered to the first actuator, since the first lever is located on the outside. Further advantageously, the first lever and the second lever overlap in a coupling portion of the fastening part, so that the coupling device in turn is designed to be very compact.

Particularly preferably, the securing element is arranged between the hinge part and a single hinge which hingedly connects the first lever and the second lever. The single hinge is particularly preferably provided for the coupling of the first lever and the second lever rotatably about the third axis of rotation. Advantageously, in the event of a forced raising of the vehicle flap and the fastening part, a shearing force is exerted on the securing element, which ultimately leads to the connection between the first lever and the fastening part being released.

Further advantages, features, and developments of the present disclosure emerge from the following description of a preferred embodiment and from the dependent claims.

BRIEF SUMMARY OF THE DRAWINGS

The present disclosure is explained in more detail below with reference to the accompanying drawings.

DETAILED DESCRIPTION

Figure 1:
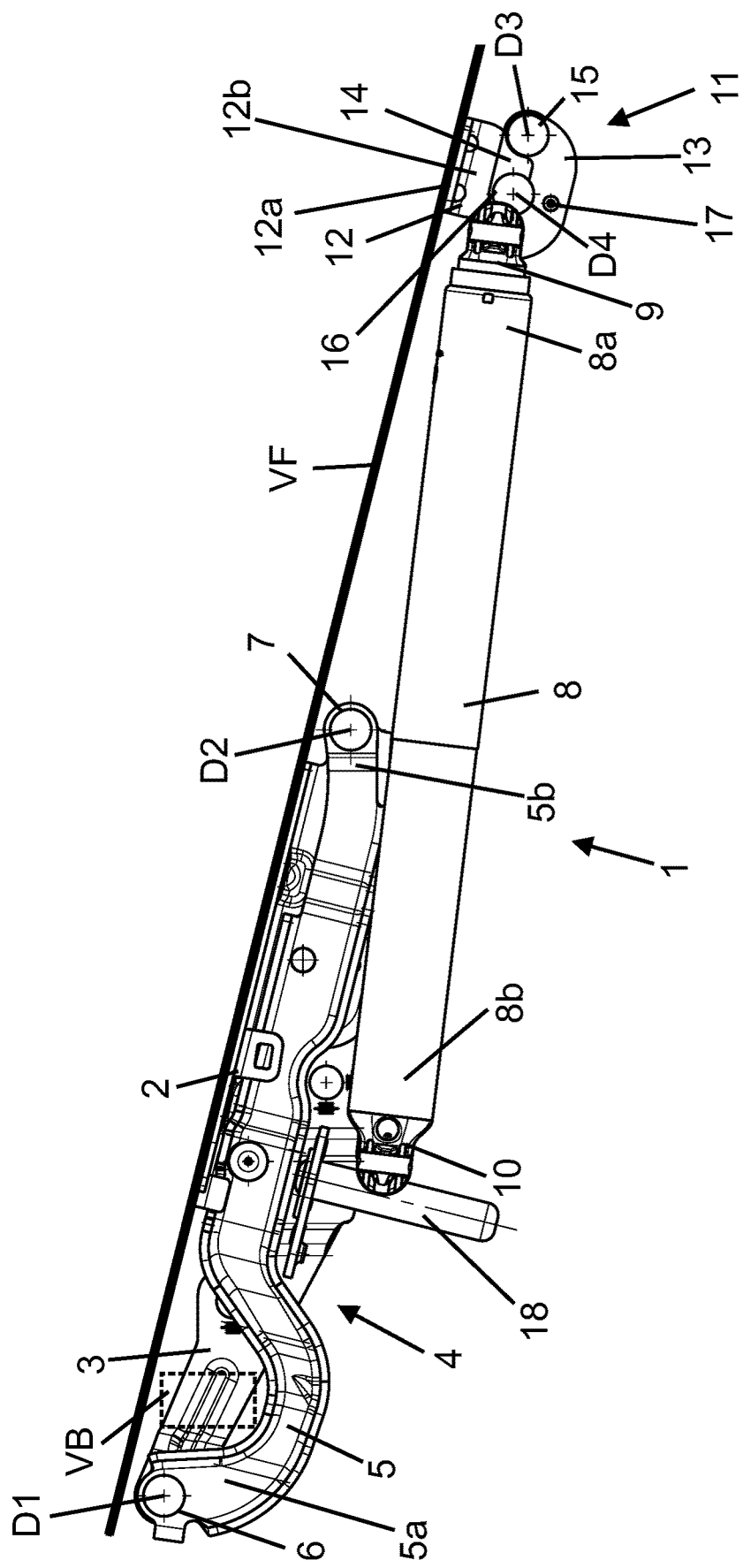
FIG. 1 shows a side view of an embodiment of a drive device in a closed normal state of the vehicle flap.

FIG. 1 shows an embodiment of a drive device 1 in a side view. The drive device 1 comprises a flap part 2 which is fixedly connected to a vehicle flap VF and a body part 3 which can be fixed to a vehicle body VB, wherein the flap part 2 is pivotable together with the vehicle flap VF relative to the body part 3 or the vehicle body VB. For this purpose, a hinge arrangement 4 is provided between the flap part 2 and the body part 3, which hinge arrangement hingedly connects the flap part 2 and the body part 3 to one another.

The hinge arrangement 4 comprises a link 5 which is connected to the body part 3 with a first end 5a via a first single hinge 6 rotatably about a first axis of rotation D1. The flap part 2 in turn is connected to a second end 5b of the link 5 via a second single hinge 7 rotatably about a second axis of rotation D2. Advantageously, the flap part 2 can be pivoted together with the vehicle flap VF via the first single hinge 6 about the first axis of rotation D1 between the closed position shown here and an open position of the vehicle flap VF provided, for example, for maintenance purposes. However, the hinge arrangement 4 also makes it possible for the vehicle flap VF to be pivoted into a pedestrian protection position by rotating the flap part 2 about the second axis of rotation D2.

The drive device 1 further comprises a first actuator 8, which in the present embodiment is designed as a spindle drive and can be adjusted in length accordingly by a motor. A first connection element 9, which is designed as a ball socket, is connected to a first end 8a of the first actuator 8. A second connection element 10, which is also designed as a ball socket, is provided at a second end 8b of the first actuator 8 opposite the first end 8a. The first end 8a of the first actuator 8 is hingedly connected via the first connection element 9 to a coupling device 11 which is arranged between the vehicle flap VF and the first actuator 8.

The coupling device 11 comprises a fastening part 12 which is fixedly arranged on the vehicle flap VF in the embodiment shown here. The fastening part 12 is designed as a flexure plate, wherein the fastening part 12 has a fastening portion 12a which is provided for fastening the coupling device 11 to the vehicle flap VF or alternatively also to the flap part 2. The fastening part 12 further comprises a coupling portion 12b which extends vertically downwards relative to the fastening portion 12a and is intended for coupling to the first actuator 8.

The coupling device 11 comprises a flat first lever 13 which is hingedly coupled to the first connection element 9 or to the first end 8a of the first actuator 8. The first lever 13 is designed as a sheet metal part and has a U-shape. In addition to the first lever 13, the coupling device 11 comprises a flat second lever 14, wherein the first lever 13 and the second lever 14 are coupled to one another via a third single hinge 15 rotatably about a third axis of rotation D3. The second lever 14 is designed as a sheet metal part and has an elongated shape. The second lever 14 is also connected to the fastening part 12 via a fourth single hinge 16 rotatably about a fourth axis of rotation D4. The first lever 13 and the second lever 14 thus form a toggle lever which, in addition to a pure rotation of the first connection element 9 or the first end 8a of the first actuator about a single axis of rotation, also allows a translational displacement relative to the fastening part 12, insofar as such a movement is not locked.

In the state shown in FIG. 1, in which the vehicle flap VF is closed during normal operation, the first lever 13 is secured via a securing element 17 against a rotation about the third axis of rotation D3 relative to the fastening part 12. In the present embodiment, the securing element 17 is designed as a shear rivet and connects the first lever 13 to the fastening part 12 in a rotationally fixed manner. Since the second lever 14 is coupled with one end to the fastening part 12 and with one end to the first lever 13, the second lever 14 is also fixed in a rotationally fixed manner relative to the fastening part 12 or the flap part 2. The first lever 13 and the second lever 14 are advantageously arranged in a relatively compact manner one above the other as a toggle lever, which requires little installation space in normal operation.

The coupling device 11 is in total immovable relative to the vehicle flap VF or the flap part 2 due to the securing element 17, so that the flap part 2 or the vehicle flap VF can be moved between a closed position and an open position in a defined manner by the first actuator 8 in normal operation.

The drive device 1 further comprises a second actuator 18 which is fixedly connected to the body part 3 and is provided for driving an opening movement of the flap part 2 relative to the body part 3 into a pedestrian protection position. The second actuator 18 is designed as a pyrotechnic actuator, so that it can advantageously drive an opening movement into the pedestrian protection position particularly quickly. In the state of the drive device 1 shown here in normal operation, the second actuator 18 is inactive.

Figure 2:
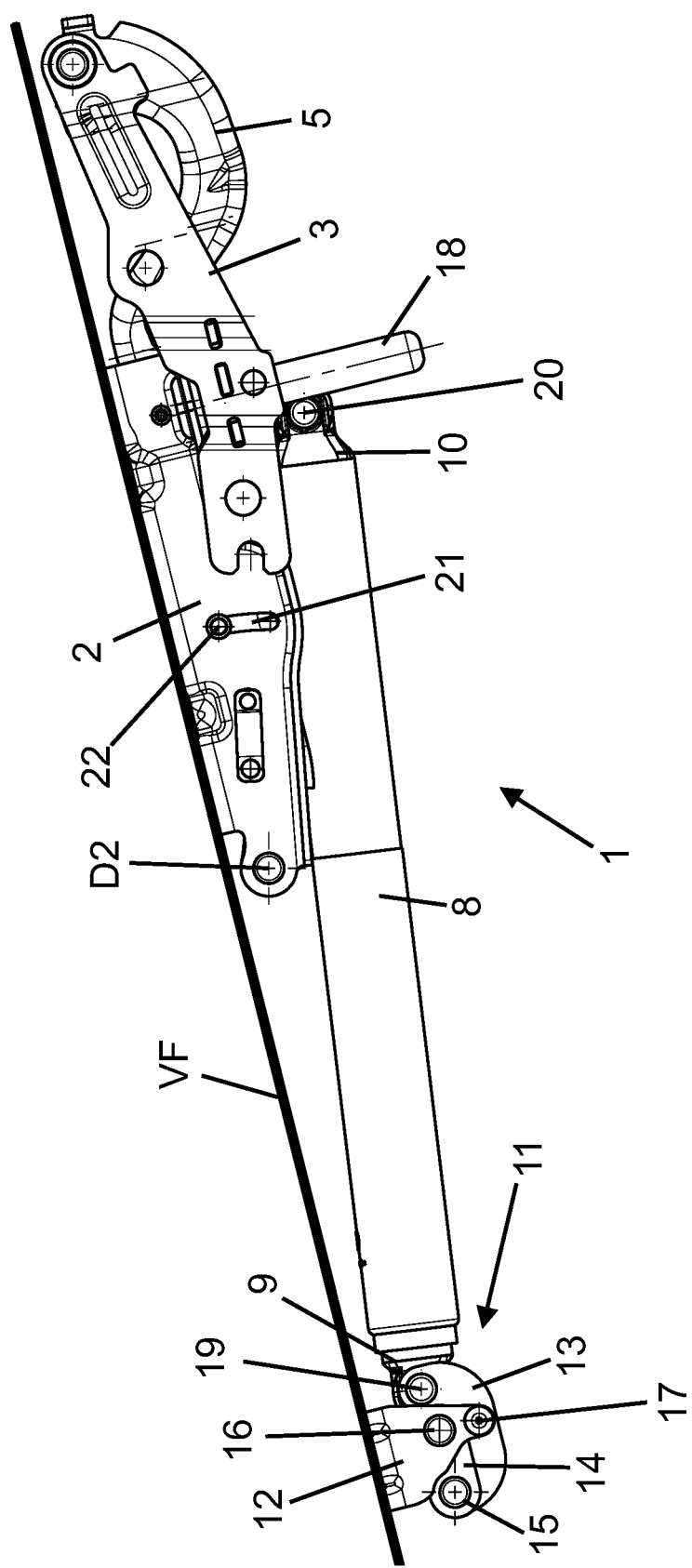
FIG. 2 shows a rear view of the drive device from FIG. 1.

FIG. 2 shows the drive device 1 from FIG. 1 in a rear view. In this view, the rear side of the coupling device 11 can also be seen. It can be seen that the second lever 14 is arranged between the fastening part 12 and the first lever 13 in a direction perpendicular to its longitudinal extension. The coupling device 11 is advantageously constructed compactly as a result of the flat design of the first lever 13, the second lever 14 and the fastening part 12 designed as a sheet metal part.

Furthermore, in addition to the third single hinge 15 and the fourth single hinge 16, via which the second lever 14 is hingedly coupled on the one hand to the first lever 13 and on the other hand to the fastening part 12, the rear side of a first ball pin 19 can be seen, which ball pin is fixedly connected to the first lever 13 and is in hinged engagement with the first connection element 9 designed as a ball socket. Furthermore, the rear side of a second ball pin 20, which is in hinged engagement with the second connection element 10 designed as a ball socket, can be seen. The first actuator 8 is advantageously hingedly connected between the flap part 2 or the vehicle flap VF and the body part 3.

Since the first lever 13 is secured against a rotation relative to the fastening part 12 or the flap part 2 via the securing element 17, which penetrates the fastening part 12 and the first lever 13, the first ball pin 19 is also spatially fixed relative to the vehicle flap VF or the flap part 2, so that a movement of the flap part 2 or of the vehicle flap VF can be driven in a defined manner by extending the first actuator 8.

It can also be seen in FIG. 2 that the flap part 2 has a narrow recess 21, which is penetrated by a stop pin 22 fixedly arranged on the link 5. This advantageously limits an opening movement or pivoting of the flap part 2s about the second axis of rotation D2. In addition, the recess 21 forms a guide contour for the stop pin 22.

Figure 3:
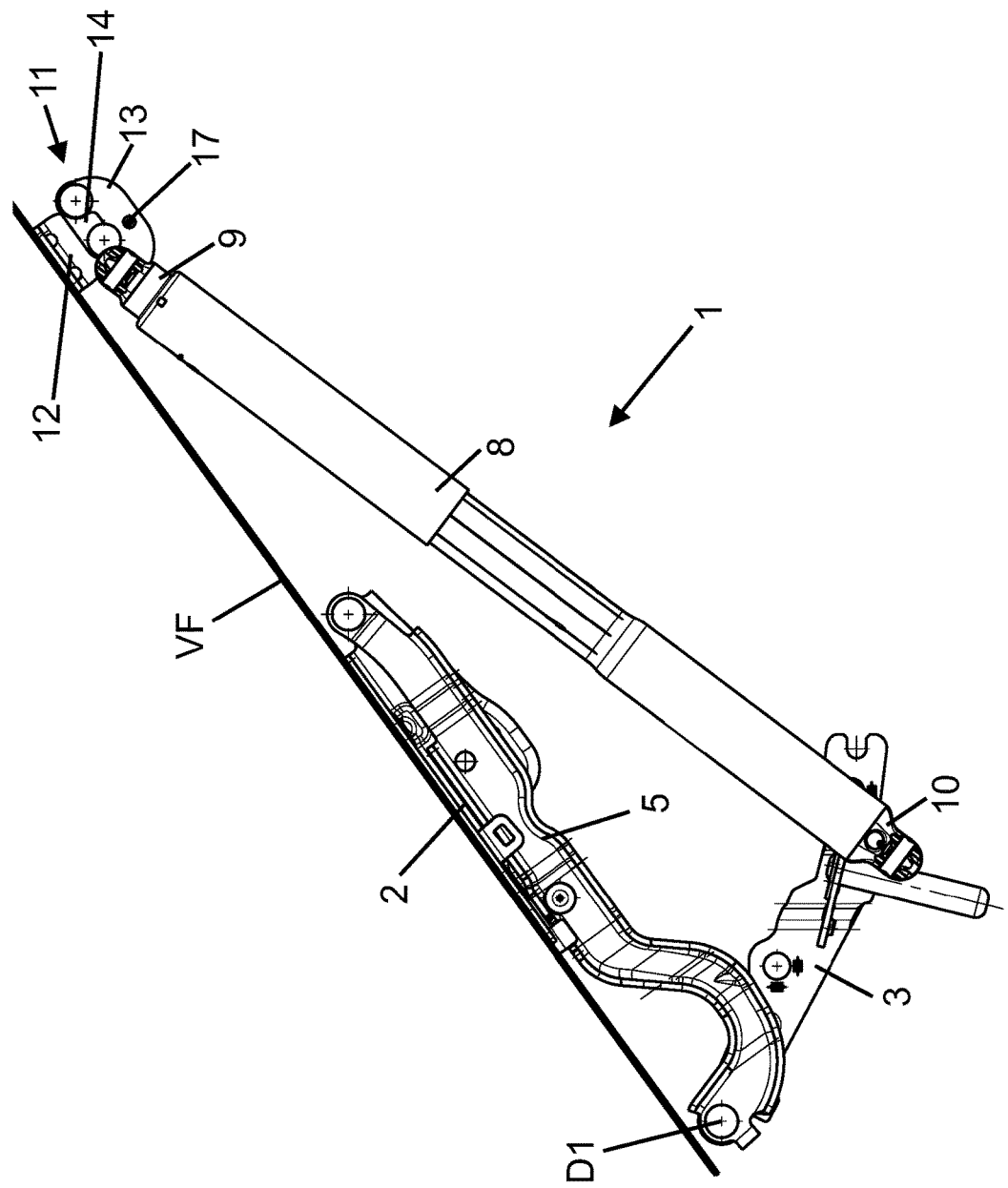
FIG. 3 shows a side view of the drive device from FIG. 1 in an open normal state.

FIG. 3 shows the drive device 1 in a side view when the vehicle flap VF is open. As a result of the motorized extension of the first actuator 8, the link 5 together with the flap part 2 and the vehicle flap VF were rotated about the first axis of rotation D1 relative to the body part 3, so that the interior of the vehicle covered by the vehicle flap VF is now exposed. Since the first actuator 8 is hingedly connected to the coupling device 11 via the first connection element 9 and is hingedly connected to the body part 3 via the second connection element 10, the linear force generated by the extension of the first actuator 8 was converted into a pivoting movement of the flap part 2 or of the vehicle flap VF.

As a result of the connections between the first lever 13 and the fastening part 12 that still exist through the securing element 17, the coupling device 11 is in the same state as when the flap is closed (see FIG. 1 or FIG. 2), i.e., both the first lever 13 and the second lever 14 are still connected to the fastening part 12 in a rotationally fixed manner.

Figure 4:
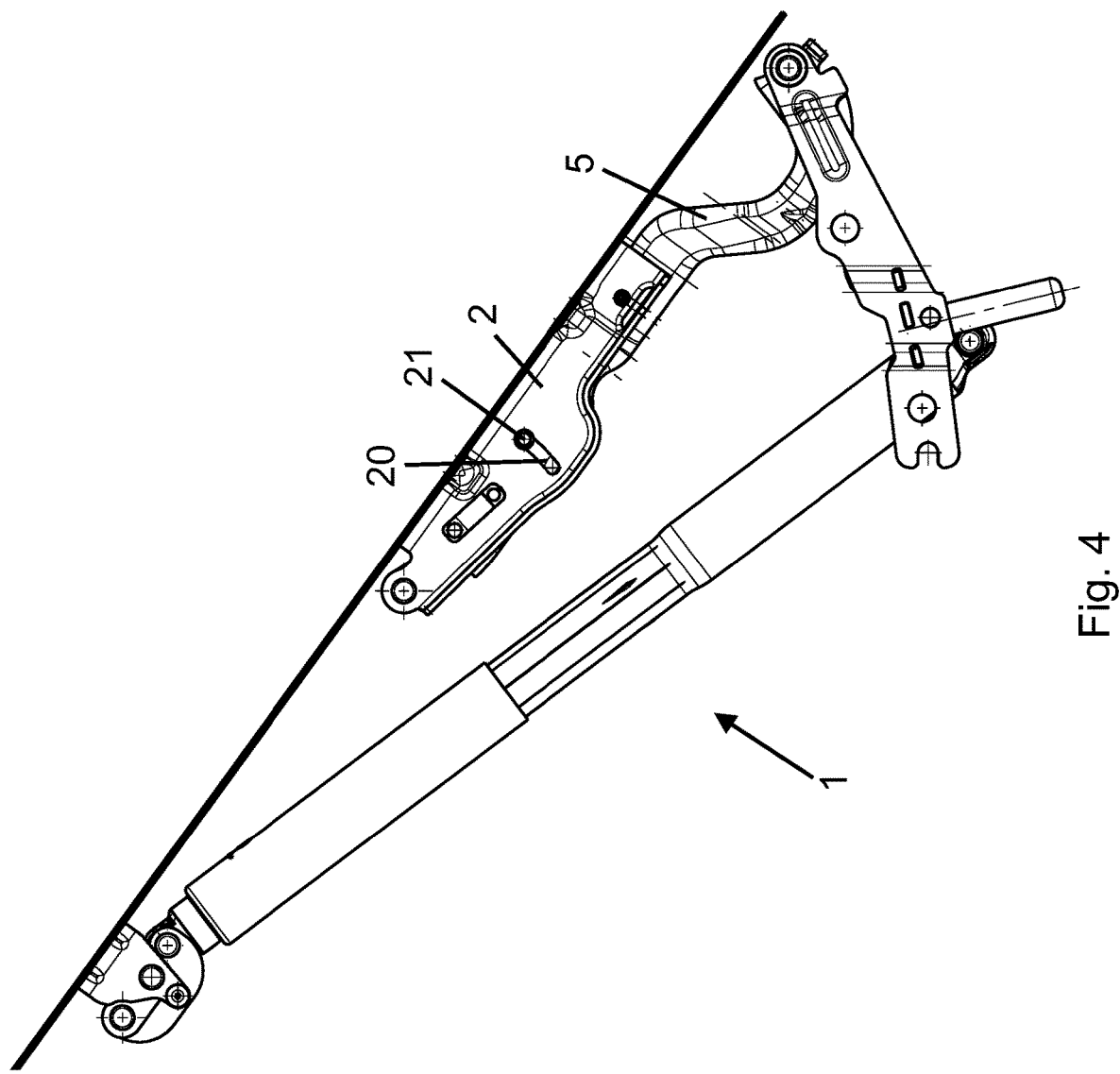
FIG. 4 shows a rear view of the drive device from FIG. 3.

FIG. 4 shows the drive device 1 from FIG. 3 in a rear view. In this view, it can be seen that the flap part 2 is still in the non-raised state relative to the link 5. Accordingly, the stop pin 22 is still in an upper end position in the recess 21.

Figure 5:
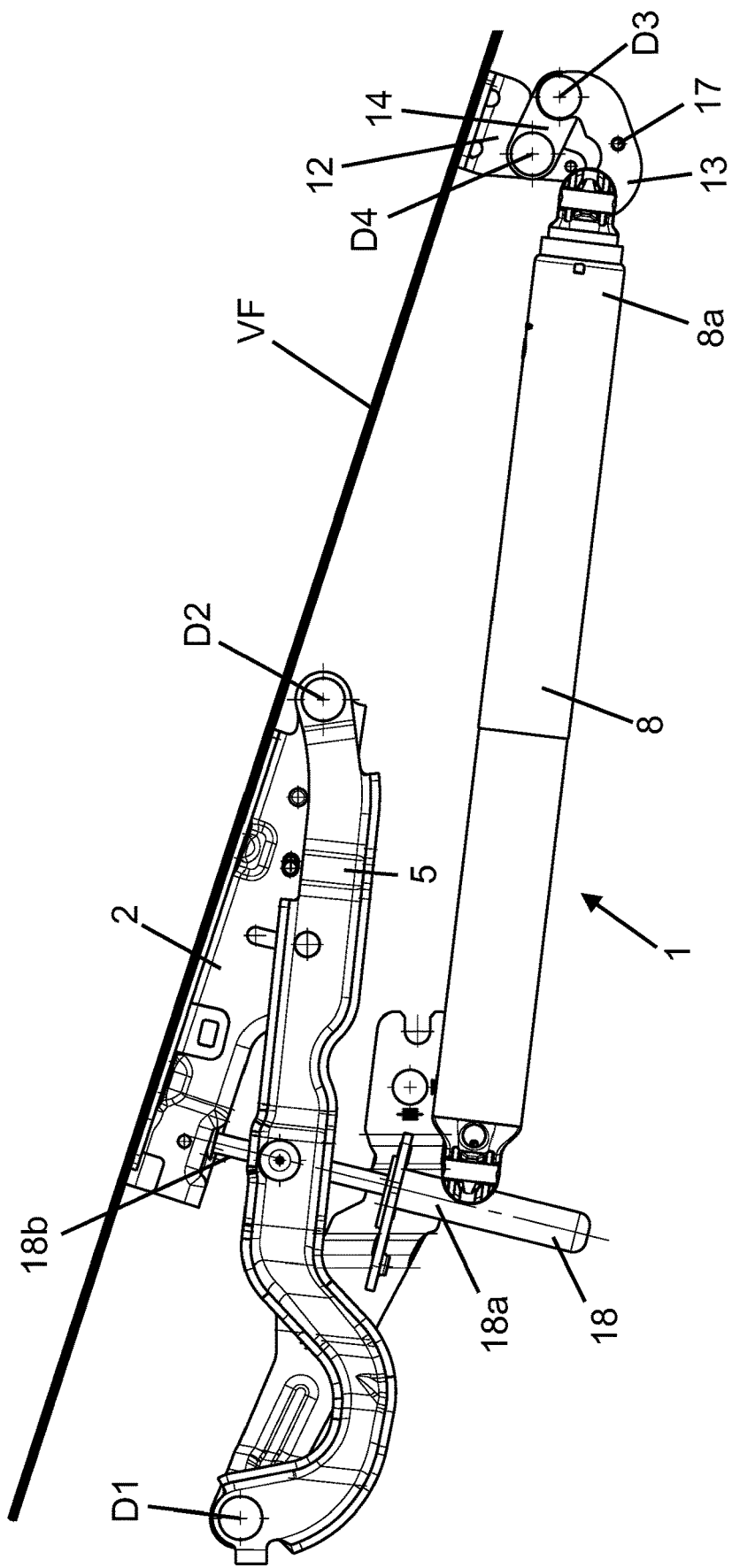
FIG. 5 shows a side view of the drive device in a raised pedestrian protection position.

FIG. 5 is a side view of the drive device 1 with the vehicle flap VF in a raised pedestrian protection position. The second actuator 18 was triggered by a detected collision with a pedestrian, wherein a piston 18b that can be extended from a main housing 18a of the second actuator 18 has been completely extended. The piston 18b abuts an underside of the flap part 2, and the flap part 2 was thereby rotated about the second axis of rotation D2 relative to the link 5. Furthermore, the link 5 was also rotated about the first axis of rotation D1, since the force brought about by the second actuator 18 also acts in the opening direction of the vehicle flap VF. However, a complete opening movement is prevented by the vehicle flap VF being locked relative to the vehicle body via a lock which is not visible here.

The force suddenly occurring perpendicular to a longitudinal extension of the vehicle flap VF was transmitted to the fastening part 12 of the coupling device 11, as a result of which the securing element 17 was sheared off or destroyed and thus the first lever 13 and the second lever 14 are now freely rotatable relative to the fastening part 12 about the third axis of rotation D3 or about the fourth axis of rotation D4. Advantageously, by releasing the rotational movement of the first lever 13 and the second lever 14, a release of the first end 8a of the first actuator 8 relative to the vehicle flap VF or the flap part 2 is generated, so that the first actuator 8 does not have to follow the rapid deployment movement of the vehicle flap VF nor is the deployment movement of the vehicle flap VF delayed by the first actuator 8.

Since the coupling device 11 is designed as a toggle lever in the embodiment shown here, the first end 8a of the first actuator 8 can simultaneously execute not only a pure rotational movement relative to the vehicle flap VF or the flap part 2 about a single axis of rotation, but rather about two axes of rotation, namely the third axis of rotation D3 and the fourth axis of rotation D4. It is thereby possible to avoid a forced change in length of the first actuator 8 more effectively, since the first end 8a can move more freely relative to the vehicle flap VF or the flap part 2.

Figure 6:
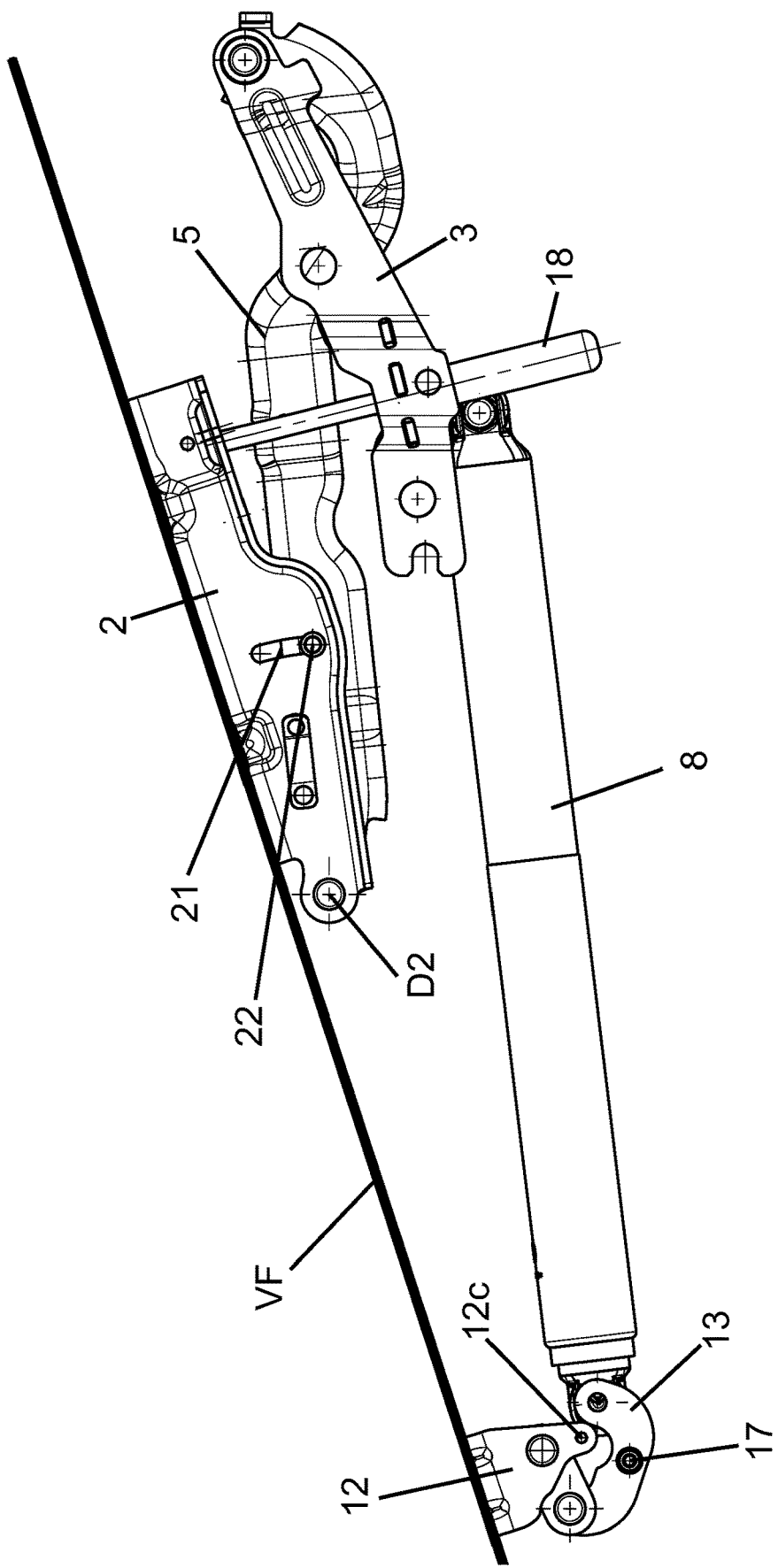
FIG. 6 shows a rear view of the drive device from FIG. 5.

FIG. 6 is a rear view of the drive device from FIG. 5. It can be seen here that the stop pin 22 has now been displaced downwards in the recess 22 by the rotation of the flap part 2 about the second axis of rotation D2 and correspondingly strikes a lower stop point. Advantageously, the deployment movement of the flap part 2 or of the vehicle flap VF is thereby effectively limited or it is ensured that a predefined deployment height is not exceeded.

It can also be seen that the securing element 17, which is fixedly connected to the first lever 13, is no longer fastened to a fastening point 12c provided on the fastening part 12, and thus the first lever 13 and the second lever 14 are now freely rotatable relative to the fastening part 12. Finally, it can also be seen that the angle or position of the first actuator 8 relative to the body part 3 has not changed compared to the closed state in normal operation (see FIG. 2). Advantageously, almost no forces are exerted on the first actuator 8 during the deployment movement of the vehicle flap VF or the of the flap part 2 due to the coupling device 11 now in the decoupled state.

The present disclosure has been explained above with reference to an embodiment in which the first actuator 8 is designed as a spindle drive. It is understood that the first actuator can also be designed as another linearly acting actuator, such as a hydraulically operated drive or similar. It is only essential for the present disclosure that the coupling device is designed to be compact and effectively prevents virtually any forces acting on the first actuator during an opening movement of the vehicle flap into a pedestrian protection position driven by a second actuator, since the coupling device allows the first actuator to remain in its usual position in normal operation.

What is claimed is:

1. A drive device for a pivotable vehicle flap, comprising:
a flap part associated with the vehicle flap;
a body part associated with a vehicle body;
a hinge arrangement which hingedly connects the flap part and the body part, wherein the hinge arrangement allows the flap part to be pivoted about a first axis of rotation for opening and closing the vehicle flap and about a second axis of rotation for raising the vehicle flap into a pedestrian protection position;
a first actuator for opening and closing the vehicle flap in normal operation;
a second actuator for raising the vehicle flap into the pedestrian protection position; and
a coupling device for coupling the first actuator to one of the flap part and the vehicle flap, comprising a fastening part which is fixedly connected to the one of the flap part and the vehicle flap, wherein the coupling device comprises at least one first lever coupled to the first actuator, wherein in normal operation, the first lever is releasably secured against rotation relative to the fastening part via a mechanical securing element.

2. The drive device according to claim 1, wherein the mechanical securing element partially penetrates the first lever and the fastening part and is arranged between them.

3. The drive device according to claim 1, wherein the mechanical securing element is released when the second actuator is actuated, in particular by breaking a predetermined breaking point, so that a release of a rotation of the first lever relative to the fastening part takes place.

4. The drive device according to claim 1, wherein the coupling device comprises a second lever.

5. The drive device according to claim 4, wherein the first lever and the second lever are coupled to one another rotatably about a third axis of rotation.

6. The drive device according to claim 5, wherein a single hinge is arranged between the first lever and the second lever.

7. The drive device according to claim 6, wherein the second lever is coupled to the fastening part rotatably about a fourth axis of rotation.

8. The drive device according to claim 7, wherein the first lever is hingedly coupled to the first actuator via a first connection element.

9. The drive device according to claim 8, wherein the first connection element is designed as a ball socket.

10. The drive device according to claim 8, wherein a hinge part is arranged on the first lever, wherein the hinge part is in hinged engagement with the first connection element.

11. The drive device according to claim 10, wherein the hinge part is expediently arranged at an end portion of the first lever.

12. The drive device according to claim 10, wherein the fourth axis of rotation is arranged between the hinge part and the third axis of rotation in normal operation.

13. The drive device according to claim 5, wherein the second lever is arranged in a direction parallel to the third axis of rotation between the first lever and the fastening part.

14. The drive device according to claim 5, wherein the first lever and the second lever overlap in a coupling portion of the fastening part.

15. The drive device according to claim 10, wherein the mechanical securing element is arranged between the hinge part and a single hinge which hingedly connects the first lever and the second lever.

* * * * *